United States Patent

Rodgers et al.

[11] Patent Number: 5,890,316
[45] Date of Patent: Apr. 6, 1999

[54] BIODEGRADABLE FISHHOOK

[76] Inventors: Jack Rodgers, 659B Del Parque Dr., Santa Barbara, Calif. 93103; Michael G. Petit, 841 Weldon Rd., Santa Barbara, Calif. 93109

[21] Appl. No.: 669,893

[22] Filed: Jun. 21, 1996

Related U.S. Application Data

[63] Continuation of Ser. No. 309,663, Sep. 20, 1994, abandoned.
[51] Int. Cl.$^6$ .................................................. A01K 97/02
[52] U.S. Cl. ............................................................ 43/43.16
[58] Field of Search ................................ 43/43.16, 44.82

[56] References Cited

U.S. PATENT DOCUMENTS

| | | | |
|---|---|---|---|
| 2,511,117 | 6/1950 | Loeb | 43/43.16 |
| 4,715,142 | 12/1987 | Richard | 43/43.16 |
| 5,024,020 | 6/1991 | Sitton | 43/43.16 |
| 5,364,616 | 11/1994 | Fish | 43/44.98 |

FOREIGN PATENT DOCUMENTS

| | | | |
|---|---|---|---|
| 9289844 | 11/1997 | Japan. | |
| 7904556 | 12/1980 | Netherlands | 43/43.16 |

*Primary Examiner*—Kurt Rowan
*Attorney, Agent, or Firm*—Michael G. Petit

[57] ABSTRACT

A fishhook is described which disintegrates upon standing for prolonged periods of time in an aqueous environment such as within biological tissue. In one embodiment, the fishhook comprises a biodegradable polymeric hook-shaped structure with at least one metal tip affixed thereto providing a sharp piercing element. Upon exposure to the chemical environment of the fish's tissue the polymer biodegrades. In another embodiment, a substantially insoluble or non-biodegradable body portion of the hook has a separable point and barb portion affixed to the insoluble portion by means of a biodegradable adhesive. When the fishhook penetrates the fish's tissue, the solvents and/or enzymes present in the tissue environment causes the adhesive to release the barb and/or the point of the fishhook and the fish may shed the disintegrated fragments. In yet another embodiment, the entire fishhook is fabricated from a biodegradable polymer such as polylactide or polyglycolide or a copolymer thereof.

3 Claims, 1 Drawing Sheet

BIODEGRADABLE FISHHOOK

CROSS REFERENCE TO RELATED APPLICATIONS

This is a continuation of application Ser. No. 08/309,663 filed Sep. 20, 1994 now abandoned.

BACKGROUND OF THE INVENTION

1. Field of the Invention

This invention relates to a biodegradable fishhook and more particularly to a fishhook that disintegrates upon prolonged exposure to biological tissue and/or an aqueous environment.

2. Prior Art

It is well understood that in certain fishing areas referred to as "catch and release" areas or "quality" fishing areas, it is unlawful to harm or take a fish. To accommodate such rules, barbless hooks are usually employed to facilitate removal of the hook from the fish's mouth in the event such is required. This removal usually ii employs taking the fish out of the water, grasping it, removing the hook and releasing the fish. The act of taking the fish out of the water or even just handling the fish can do irreparable damage and seriously injure the fish. In summary, the prior art does not provide a fishhook which does not endanger the life of the animal in the event the fishhook cannot be removed such as occurs, for example, when a fish breaks the leader and escapes. For this reason, it is desirable to have a fishhook which, upon penetrating the flesh of a fish, may be cut loose from the fishing line by means of a cutting tool is leaving the hook safely embedded in the fish's tissue. Upon prolonged exposure to the aqueous/biological environment, the fishhook will disintegrate or self-release from its impaling relationship with the fish.

SUMMARY OF THE INVENTION

It is an object of this invention to provide a fishhook which may be embedded within the tissue of a fish for a prolonged period of time ranging from one day to three months without endangering the life of the fish.

It is another object of this invention to provide a fishhook which disintegrates upon prolonged exposure to the environment encountered when at least a portion of the fishhook is embedded within a fish's body.

It is still another object of this invention to provide a fishhook having a structural integrity which has short term (1–3 days) structural durability as appropriate for fishing yet having a structure that disintegrates upon prolonged exposure to an aqueous or biological environment.

The features of this invention believed to be novel are set forth with particularity in the appended claims. However, the invention itself, both as to organization and method of operation together with further objects and advantages thereof may best be understood by reference to the following description taken in conjunction with the accompanying drawings in which:

DESCRIPTION OF THE PREFERRED EMBODIMENTS

Biodegradability can be defined as the ability of a tissue-compatible material to degrade at some time after implantation within the tissue of an animal into nontoxic products which are eliminated from the body or metabolized therein. Although this term is preferred, it is often used interchangeably with the terms bioabsorbable, biofragmentation, bioerodible, biodisintegrative and biodegradable. The term biodegradable, as used herein, refers to materials which experience accelerated degradation by the action of either water or of life forms present in the environment, for example bacteria, fungi and/or enzymes. Bioabsorbable polymers also are biodegradable, but the converse may not be true. Bioabsorbable materials include water soluble adhesives.

Figure 1:
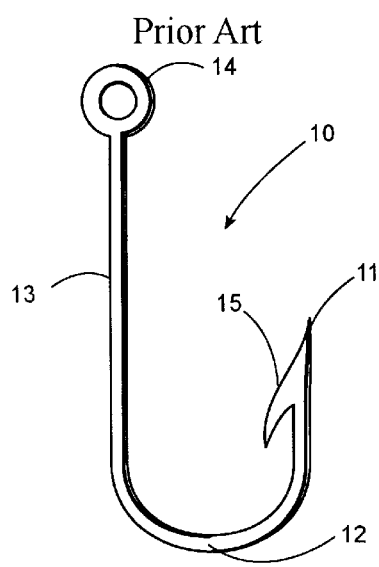
FIG. 1 is a fishhook in accordance with the prior art.

FIG. 1 shows a fishhook in accordance with the prior art. The fishhook, generally indicated at 10, includes a sharp tip 11, a curved portion 12, a shank 13, and an attachment opening or hole 14 in the end of the shank which hole is useful for attaching the hook to a fishing line or leader. The shank 13 forms a rigid connection between the attachment opening or hole 14 and the sharp point 11. A barb 15 projects from the fishhook in a direction opposite to that of the sharp point 11. When the fishhook 10 in accordance with the prior art becomes embedded in a fish's mouth, the sharp point 11 punctures the tissue and the hook enters the flesh until the barb further penetrates the flesh. Once the barb 15 is under the flesh, it makes the hook extremely difficult to remove. To do so requires advancing the hook through the fish's mouth until the barb exits the skin. The hook may then be removed by severing the fishing line. All this must be done while holding the fish substantially immobile.

Figure 2:
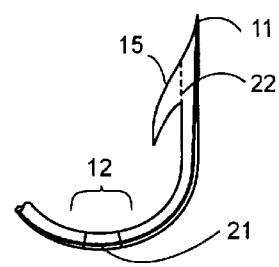
FIG. 2 shows the curved invasive portion of a fishhook in accordance with the present invention.

The curved portion of the fishhook 10 is shown in greater detail in FIG. 2. The sharp tip 11 and the barb 15 are arranged at the tip of the hook as shown. In the present invention, it is intended that the barb may or may not be present. If the barb 15 is present on the hook, the barb can be made either biodegradable or water soluble. Alternatively, the barb 15 can be attached to the hook by means of a water soluble or biodegradable adhesive. Such adhesives are well known in the art and include polymer resins. A portion 21 of the curved portion 12 of the hook 10 may also be made to be either biodegradable or water soluble or contain a coupling member (not shown) providing structural continuity of the curved portion which coupling member is affixed to the curved portion 12 by means of a biodegradable or water soluble adhesive.

The biodegradable portion 21 of the curved portion 12 of the hook 10 may be made from a biopolymer such as chitin, chitosan, methyl cellulose, cellulose, lignin, or synthetic polymers such as polylactides, polyglycolides, polymethyl methacrylate or similar materials. The stiffness of polymers may be increased by using fiber-reinforced composites. (See, for example, Kelley, B. S. et al. "Totally Reabsorbable High-Strength Composite Material" in Polym. Sci. Technol., 35 (Adv. Biomed. Polym.), pp 75–85 (1987)). Higashi et al, while developing a bioabsorbable bone fixation plate ("Polymer-Hydroxyapetite Composites for Biodegradable Bone-Fillers", Biomaterials, 1, pp 183–187 (1986)) have developed a composite bioabsorbable polymer which has the structural characteristics and rigidity required for a fishhook. Poly-L-lactide is crystalline whereas poly-D,L-lactide is an amorphous polymer. Copolymers containing varying amount of the racemic D,L-lactide with the L-lactide have variable tensile strength and rates of bioabsorption depending on the concentration of copolymers. Copolymers of glycolide and lactide form a class of bioabsorbable polymers which are toxicologically safe and readily available in commercial quantities. In applications requiring high structural strength, a blend of poly-L-lactide with poly-D-lactide may be employed. These polymers are eliminated from the body by hydrolytic degradation and subsequent metabolism.

A representative list of synthetic biodegradable polymers which may be used for molding a biodegradable fishhook include:

polydioxanone polyglycolic acid (polyglycolide) VGA)

polycaprolactone poly (L-lactide-co-30%-glycolide)

poly (esteramide)

polylactic acid (polylactide)

poly (ortho ester) (a "bioerodible" polymer)

polyglycolide plus a salt (molded)

either in combination as copolymers or as a homopolymer. If a readily hydrolyzable polymer is employed it may be coated with a hydrophobic biodegradable polymer to slow disintegration in an aqueous environment.

A molded unit having high strength and stiffness is desired for a biodegradable fishhook. Injection molding of semicrystaliine polymers such as poly-L-lactide requires a rapid rate of crystallization to obtain a reasonable cycle time and small crystallite size. Slow formation of large spherulitic crystallites often leads to a brittle material or one which will become brittle with time. The injection mold cavity is preferably heated to the crystallization endotherm where small crystallites can form to act as a reinforcement of the polymer matrix to achieve a higher tensile strength. Alternatively, the molded parts may be stressed to achieve orientation prior to crystallization.

A biodegradable fishhook may also be molded from polyglycolide. Articles molded from polyglycolide become brittle when exposed to gamma irradiation. By varying the dosage of gamma irradiation the time required for biofragmentation or disintegration may be varied. Preferably a fishhook in accordance with any of the embodiments of this invention will fragment or disintegrate in 3–14 days although portions of a biodegradable fishhook may persist within a fish for several months without endangering the animal.

Alternatively, rather than a biodegradable polymer complex, the biodegradable portion 21 of the fishhook may be made from a water soluble composite crystalline material such as a protein or salt. In any event, if the barb 15 breaks away from the remainder of the hook, the fragment of the hook which remains in the flesh can be rejected by the fish provided the path is not too tortuous. In the event that a prior art fishhook is swallowed and enters the fish's gullet, removal of such prior art fishhooks without causing injury to the fish is difficult or impossible. The biodegradable portions of the fishhook of the present invention eliminate the need for removal inasmuch as the hook will disintegrate.

Figure 3:
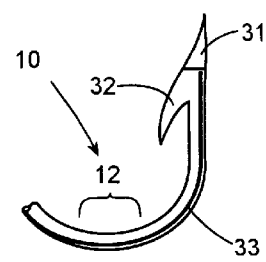
FIG. 3 is a perspective view of a preferred embodiment of the fishhook of the present invention showing sharp metal caps affixed to an otherwise biodegradable fishhook.

In FIG. 3 we see an alternate embodiment of the fishhook of FIG. 2 wherein the hook 10 is made entirely of a biodegradable material such as the synthetic biodegradable polymers listed above or the biopolymers such as cellulose or methyl cellulose or chitin. The points 31 and 32 comprising the tip and the barb may be conveniently made either separately or as a single cap from a small piece of a sharp metallic material which may be glued onto the biodegradable matrix to provide a sharp piercing point for penetration. The caps 31 and 32 will fall off the hook 33 when the adhesive degrades, and the body of the hook 33 will also degrade. Following disintegration, (i.e. loss of the barb and shank) the remaining fragments of the hook will be rejected by the fish even if the body of the hook does not completely degrade.

Figure 4:
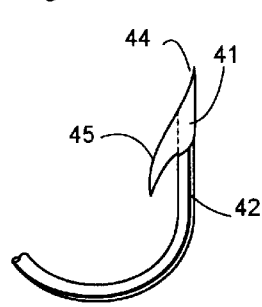
FIG. 4 is a perspective view of a distal end of another preferred embodiment of a fishhook wherein the barb and point of the hook are affixed to the hook by means of a biodegradable adhesive.

A further embodiment of a unitary hook and barb on either a biodegradable or non-biodegradable rigid support 42 is shown in FIG. 4. The hook of FIG. 4 comprises a rigid support 42 which could be steel or it may be a biodegradable polymer. The tip of the fishhook is terminated in a sharp metallic piece indicated at 41 having a sharp tip 44 and a barb 45. The sharp metallic piece 41 has a hole therewithin dimensioned to accommodate at least a portion of the support 42 comprising the general body of the hook.

Figure 5:
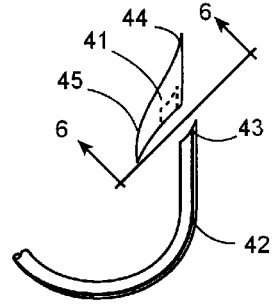
FIG. 5 is a somewhat schematic view of the distal invasive end of a fishhook in accordance with FIG. 4 with the metal barb and tip removed from the body of the fishhook.
Figure 6:
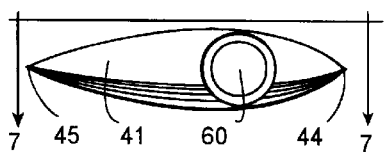
FIG. 6 is a bottom view of the barb and point portion of the fishhook along section line 6—6 of FIG. 5.
Figure 7:
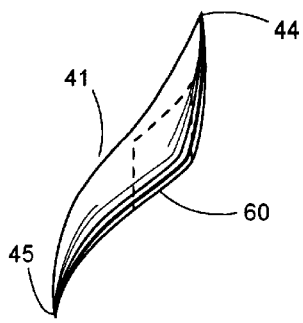
FIG. 7 is a side perspective view of the barb and tip portion of the fishhook along section line 7—7 of FIG. 6.

The relationship of the tip 41 of the hook 42 with respect to the hook 42 is shown more clearly in FIG. 5. The hook, without the tip 41 is fabricated from a biodegradable polymer such as, for example, polylactide. The sharp metallic terminus 41 is made from steel or a similar material which is hard and holds a sharp point. The sharp terminus 41 is recessed to fit snugly over the tip 43 of the biodegradable polymer portion of the hook. The sharp metallic piece 41 is affixed to the tip 43 of the biodegradable tip portion of the hook 42 by means of a water soluble or biodegradable adhesive. After the sharp metallic terminus 41 of the hook penetrates the fish's flesh, the fish's enzymes and/or water attack the adhesive binding the tip 41 to the hook 42 and cause the tip to separate from the hook. The hook then works its way out by natural rejection by the fish as does the tip. The tip, generally comprises a small metal piece which is shown in cross-section in FIGS. 6 and 7.

Figure 8:
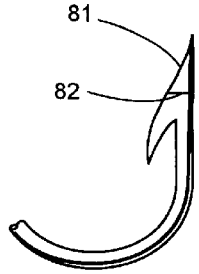
FIG. 8 is a perspective view of a bioabsorbable fishhook having a non-bioabsorbable sharp point affixed thereto.
Figure 9A:
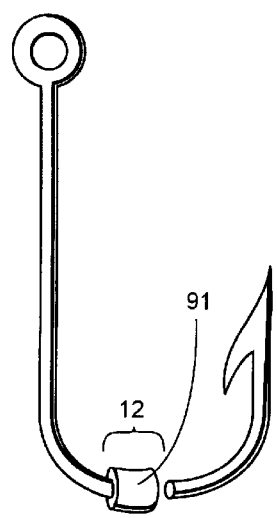
FIGS. 9a and 9b show an embodiment of a disintegrating fishhook wherein the body portion is held together by means of a coupler.
Figure 9B:
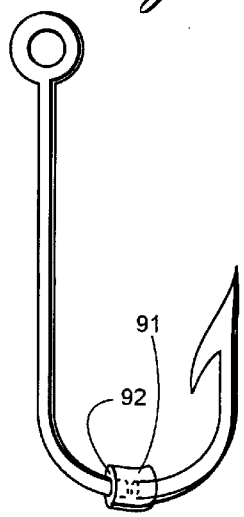

In the event that a sharp metal tip 81 and/or barb is to be bonded to the biodegradable body of the hook, as shown in FIG. 8, an adhesive 82 is preferred. As a general rule, ultrasonic welding and solvent bonding do not usually work well with dissimilar materials although there are exceptions. A biodegradable adhesive, on the other hand, can be used to bond metal to polymer or metal to metal. Although UV cured adhesives, cyanoacrylates, hot melts and epoxies may all be used, only the first two are preferred. Cyanoacrylate adhesives have the advantage that they degrade upon prolonged exposure to water. To delay premature fragmentation between a bonded portion of the fishhook and the body of the fishhook the bonded portion may be coated with a thin erodible hydrophobic layer such as a wax. As the hydrophobic layer erodes as, for example, from contact with a fish's teeth, the water soluble adhesive bonding the hook together is exposed to water and dissolution of the adhesive progresses until fragmentation of the fishhook occurs. A portion of the hook may be constructed to break apart upon prolonged exposure to water as shown in FIG. 9. A coupler 91 is employed to envelope adjacent ends of the body of the hook. The coupler, which is bonded to the hook by means of a water soluble adhesive 92, releases the hook producing fragments thereof upon prolonged exposure to water.

While particular embodiments of the present invention have been illustrated and described it would be obvious to those skilled in the art that various other changes and modifications can be made without departing from the spirit and scope of the invention. It is therefor intended to cover in the appended claims all such changes and modifications that are within the scope of this invention.

What we claim is:

1. A fishhook consisting of a homogenous biodegradable polymer, said fishhook disintegrating upon prolonged exposure to the ambient chemical environment present within a tissue of a fish.

2. A fishhook comprising a non-biodegradable sharp tip and a shank consisting of a biodegradable polymer and wherein said non-biodegradable tip is affixed to said biodegradable shank by adhesive means.

3. A fishhook comprising a sharp tip consisting of a homogeneous non-metallic biodegradable polymer affixed to a non-biodegradable shank portion by adhesive means.

* * * * *